(12) United States Patent
Asver et al.

(10) Patent No.: US 9,563,607 B2
(45) Date of Patent: Feb. 7, 2017

(54) SYSTEM AND METHOD FOR CREATING SLIDESHOWS

(71) Applicant: Google Inc., Mountain View, CA (US)

(72) Inventors: AJ Asver, San Francisco, CA (US); Vincent Mo, Sunnyvale, CA (US); Antin Harasymiv, Calwell (AU); Denise Ho, Los Altos, CA (US); Zachary Yeskel, San Francisco, CA (US); Nicholas Gordon Fey, Mountain View, CA (US)

(73) Assignee: Google Inc., Mountain View, CA (US)

( * ) Notice: Subject to any disclaimer, the term of this patent is extended or adjusted under 35 U.S.C. 154(b) by 277 days.

(21) Appl. No.: 13/927,864

(22) Filed: Jun. 26, 2013

(65) Prior Publication Data

US 2013/0346869 A1    Dec. 26, 2013

Related U.S. Application Data

(60) Provisional application No. 61/664,689, filed on Jun. 26, 2012.

(51) Int. Cl.
*G06F 17/21* (2006.01)
*G06Q 50/00* (2012.01)
*G06Q 10/10* (2012.01)

(52) U.S. Cl.
CPC .............. *G06F 17/212* (2013.01); *G06Q 10/10* (2013.01); *G06Q 50/01* (2013.01)

(58) Field of Classification Search
CPC ....................................................... G06F 17/21
See application file for complete search history.

(56) References Cited

U.S. PATENT DOCUMENTS

| | | | |
|---|---|---|---|
| 7,853,483 B2 | 12/2010 | Patten | |
| 2005/0235062 A1 | 10/2005 | Lunt | |
| 2006/0064639 A1 | 3/2006 | Reid et al. | |
| 2007/0250496 A1 | 10/2007 | Halliday | |
| 2008/0205789 A1* | 8/2008 | Ten Kate | G06T 11/60 382/284 |
| 2008/0310829 A1* | 12/2008 | Bakewell | G03B 15/00 396/2 |
| 2010/0191827 A1* | 7/2010 | Martin | G06F 17/30867 707/723 |
| 2010/0293157 A1* | 11/2010 | Ito | G06F 17/30867 707/723 |
| 2011/0099486 A1* | 4/2011 | Nesladek | G01C 21/265 715/753 |
| 2011/0202866 A1* | 8/2011 | Huang | G06F 3/0482 715/779 |
| 2011/0218998 A1 | 9/2011 | Mercer | |
| 2012/0030282 A1* | 2/2012 | Brody | G06Q 50/01 709/203 |
| 2012/0096352 A1 | 4/2012 | Maor et al. | |

(Continued)

FOREIGN PATENT DOCUMENTS

| | | |
|---|---|---|
| JP | 2011530875 | 12/2011 |
| JP | 2013524348 | 6/2013 |

(Continued)

OTHER PUBLICATIONS

International Search Report, dated Feb. 26, 2014, for related PCT Application No. PCT/US2013/047918.

(Continued)

*Primary Examiner* — David Choi (74) *Attorney, Agent, or Firm* — IP Spring (57) ABSTRACT

A computer-implemented method and computing system for generating a slideshow is provided. The method may include generating, using one or more computing devices, an event page corresponding to a particular event, the event page associated with a social network. The method may also include allowing access to the event page to one or more members of the social network. The method may further include receiving at least one photograph at the event page from the one or more members of the social network, displaying the at least one photograph at the event page and generating a slideshow based upon, at least in part, the at least one photograph received at the event page.

17 Claims, 7 Drawing Sheets

(56) References Cited

U.S. PATENT DOCUMENTS

| | | | | |
|---|---|---|---|---|
| 2013/0031475 A1* | 1/2013 | Maor | .................. | A63F 13/12 715/706 |
| 2013/0042169 A1* | 2/2013 | Reedy | .................. | G06Q 50/01 715/202 |
| 2013/0132836 A1* | 5/2013 | Ortiz | .................. | G06F 3/01 715/716 |
| 2013/0346869 A1* | 12/2013 | Asver | .................. | G06F 17/212 715/730 |

FOREIGN PATENT DOCUMENTS

| | | |
|---|---|---|
| WO | WO 2010/017204 | 2/2010 |
| WO | WO 2011/123546 | 10/2011 |

OTHER PUBLICATIONS

International Preliminary Report on Patentability and Written Opinion for International Application No. PCT/US2013/047918, Dec. 31, 2014.
"KIPO Notice of Preliminary Rejection", Korean Application No. 10-2015-7001947, Dec. 30, 2015.
"JPO", Notice of Reasons for Rejection, in Japanese Application No. 2015-520469, Apr. 4, 2016.
"European Extended Search Report", European Application No. 13734629.2, Jan. 12, 2016, 6 pages.
"Final Office Action in Japanese Application No. 2015-520469", Dec. 12, 2016, 8 pages.

* cited by examiner

FIG. 7

SYSTEM AND METHOD FOR CREATING SLIDESHOWS

CROSS-REFERENCE TO RELATED APPLICATIONS

This application claims the benefit of U.S. Provisional Application having Ser. No. 61/664,689, filed Jun. 26, 2012, of which the entire contents are incorporated herein by reference.

TECHNICAL FIELD

This disclosure relates to slideshow generation and, more particularly, to a method for real-time generation of slideshows.

BACKGROUND

Creation of a slideshow is often a time-intensive process, which may involve multiple people providing images and/or organizing the layout of the slideshow for a desired effect. In some cases, such as during a particular event, multiple people may be taking photos and contributing to a single collection. Parsing through all of these photos occurs after the event has concluded and typically requires a great deal of time and effort.

SUMMARY OF DISCLOSURE

In another implementation a computer-implemented method may include generating, using one or more computing devices, an event page corresponding to a particular event, the event page associated with a social network. The method may also include allowing access to the event page to one or more members of the social network. The method may further include receiving at least one photograph at the event page from the one or more members of the social network and displaying the at least one photograph at the event page. The method may also include providing at least one of the one or more members with an option to view the at least one photograph as a slideshow. The method may further include generating the slideshow based upon, at least in part, the at least one photograph received at the event page and displaying at least a portion of the slideshow on the event page.

In another implementation a computer-implemented method may include generating, using one or more computing devices, an event page corresponding to a particular event, the event page associated with a social network. The method may also include allowing access to the event page to one or more members of the social network and receiving at least one photograph at the event page from the one or more members of the social network. The method may also include displaying the at least one photograph at the event page and generating a slideshow based upon, at least in part, the at least one photograph received at the event page.

One or more of the following features may be included. In some embodiments, displaying may occur during the event. The method may also include providing a slideshow generation option on the event page. In some embodiments, receiving at least one photograph at the event page may include receiving at least one photograph from a plurality of the one or more members of the social network. In some embodiments, displaying may be based upon, at least in part, photograph display logic configured to determine a manner of displaying the at least one photograph. In some embodiments, the photograph display logic may include photograph skipping logic. The at least one photograph may include a display of one or more of an event name, a contributor name, a contributor image, a creation time, and a relative time of creation. In some embodiments, displaying may occur after the event. The method may include enabling social commentary associated with the at least one photograph. The method may further include allowing access to the event page to a restricted subset of the one or more members of the social network.

In another implementation, a computing system includes a processor and memory configured to perform operations including generating, using one or more computing devices, an event page corresponding to a particular event, the event page associated with a social network. Operations may also include allowing access to the event page to one or more members of the social network and receiving at least one photograph at the event page from the one or more members of the social network. Operations may also include displaying the at least one photograph at the event page and generating a slideshow based upon, at least in part, the at least one photograph received at the event page.

One or more of the following features may be included. In some embodiments, displaying may occur during the event. Operations may also include providing a slideshow generation option on the event page. In some embodiments, receiving at least one photograph at the event page may include receiving at least one photograph from a plurality of the one or more members of the social network. In some embodiments, displaying may be based upon, at least in part, photograph display logic configured to determine a manner of displaying the at least one photograph. In some embodiments, the photograph display logic may include photograph skipping logic. The at least one photograph may include a display of one or more of an event name, a contributor name, a contributor image, a creation time, and a relative time of creation. In some embodiments, displaying may occur after the event. Operations may include enabling social commentary associated with the at least one photograph. Operations may further include allowing access to the event page to a restricted subset of the one or more members of the social network.

The details of one or more implementations are set forth in the accompanying drawings and the description below. Other features and advantages will become apparent from the description, the drawings, and the claims.

DETAILED DESCRIPTION OF THE EMBODIMENTS

Figure 1:
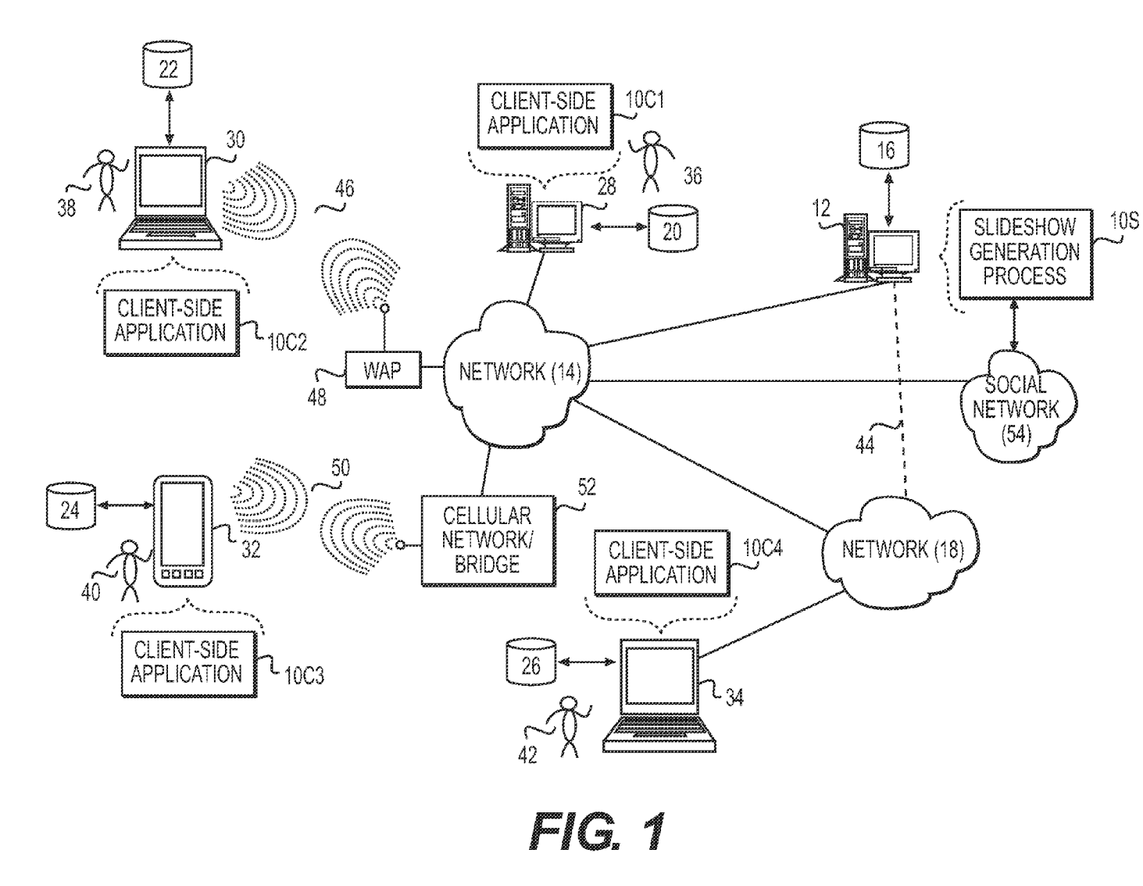
FIG. 1 is a diagrammatic view of a distributed computing network including a computing device that executes a slideshow generation process according to an embodiment of the present disclosure.

Referring to FIG. 1, there is shown slideshow generation process 10. For the following discussion, it is intended to be understood that slideshow generation process 10 may be implemented in a variety of ways. For example, slideshow generation process 10 may be implemented as a server-side process, a client-side process, or a server-side/client-side process.

For example, slideshow generation process 10 may be implemented as a purely server-side process via slideshow generation process 10s. Alternatively, slideshow generation process 10 may be implemented as a purely client-side process via one or more of client-side application 10c1, client-side application 10c2, client-side application 10c3, and client-side application 10c4. Alternatively still, slideshow generation process 10 may be implemented as a server-side/client-side process via slideshow generation process 10s in combination with one or more of client-side application 10c1, client-side application 10c2, client-side application 10c3, and client-side application 10c4.

Accordingly, slideshow generation process 10 as used in this disclosure may include any combination of slideshow generation process 10s, client-side application 10c1, client-side application 10c2, client-side application 10c3, and client-side application 10c4.

Figure 2:
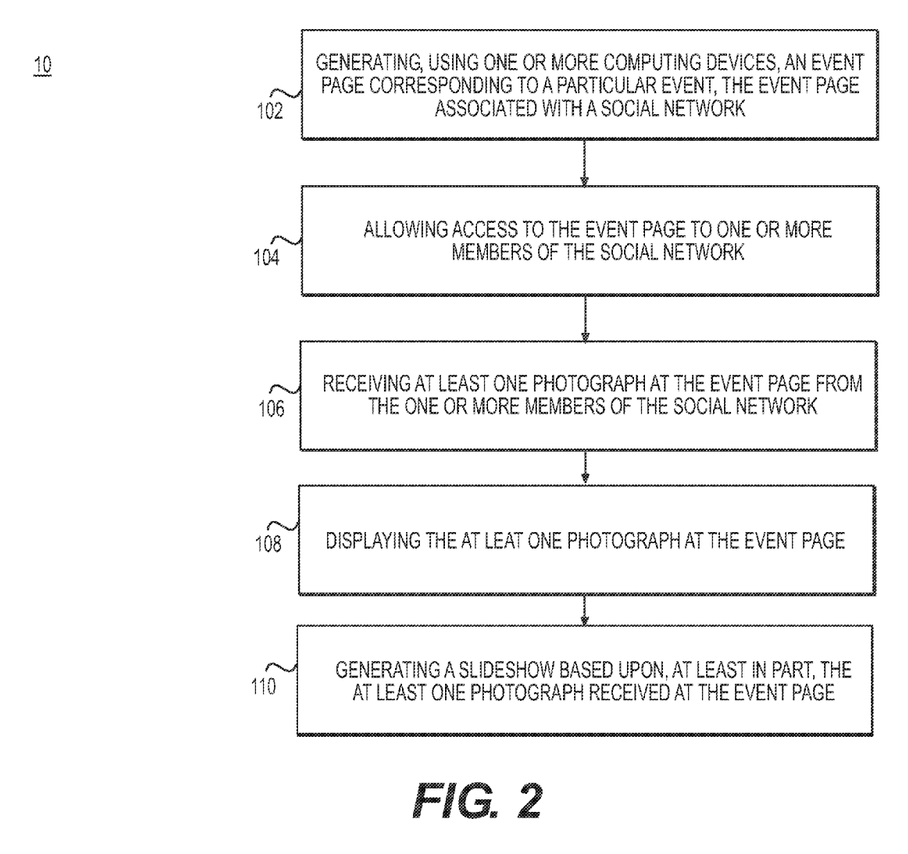
FIG. 2 is a flowchart of operations consistent with the slideshow generation process of the present disclosure.

Referring also to FIG. 2 and as will be discussed below in greater detail, slideshow generation process 10 may include generating (102), using one or more computing devices, an event page corresponding to a particular event, the event page associated with a social network. The method may also include allowing (104) access to the event page to one or more members of the social network. The method may further include receiving (106) at least one photograph at the event page from the one or more members of the social network, displaying (108) the at least one photograph at the event page and generating (110) a slideshow based upon, at least in part, the at least one photograph received at the event page.

Slideshow generation process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of slideshow generation process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, a television user interface, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, desktop computer 28, laptop computer 30, data-enabled, cellular telephone 32, notebook computer 34, a server computer (not shown), a personal gaming device (not shown), a data-enabled television console (not shown), a personal music player (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access slideshow generation process 10 directly through network 14 or through secondary network 18. Further, slideshow generation process 10 may be accessed through secondary network 18 via link line 44.

The various client electronic devices (e.g., client electronic devices 28, 30, 32, 34) may be directly or indirectly coupled to network 14 (or network 18). For example, desktop computer 28 is shown directly coupled to network 14 via a hardwired network connection. Laptop computer 30 is shown wirelessly coupled to network 14 via wireless communication channel 46 established between laptop computer 30 (respectively) and wireless access point (i.e., WAP) 48, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Further, data-enabled, cellular telephone 32 is shown wirelessly coupled to network 14 via wireless communication channel 50 established between data-enabled, cellular telephone 32 and cellular network/bridge 52, which is shown directly coupled to network 14. Additionally, notebook computer 34 is shown directly coupled to network 18 via a hardwired network connection.

Slideshow generation process 10 may be configured to interact with social network 54. An example of social network 54 may include but is not limited to Google+™, Facebook™, etc. Accordingly, slideshow generation process 10 may be configured to be a portion of/included within social network 54. Alternatively, slideshow generation process 10 may be configured to be a stand-alone process that interacts with (via e.g., an API) social network 54. Social network 54 may be configured to allow users (e.g., users 36, 38, 40, 42) to communicate with and/or control one or more robots (e.g. robot 56) via social network 54.

The Slideshow Generation Process:

As discussed above and referring also to FIGS. 2-7, slideshow generation process 10 may allow for the creation and display of some or all of the photos and/or images uploaded from an event, e.g., in real-time, in a dynamically updating slideshow. FIGS. 3-6 depict example screenshots associated with slideshow generation process 10. In this way, photographs 400, 500 as well as a credits page 600, may also be generated.

The slideshow generation process described herein may be used in conjunction with one or more social networking applications. For example, during an event, it may be possible to see some or all of the photographs from the live stream flowing in as people are taking them. The slideshow generation process described herein may enable a live stream slideshow optimized for scenarios like mega events like the Olympics where there are large quantities of photos and numerous television screens projecting the event live. Additionally and/or alternatively, slideshow generation process 10 may be used for private events with remote attendees who cannot attend, for example, an aunt watching her niece's birthday party from a remote location, etc.

Figure 3:
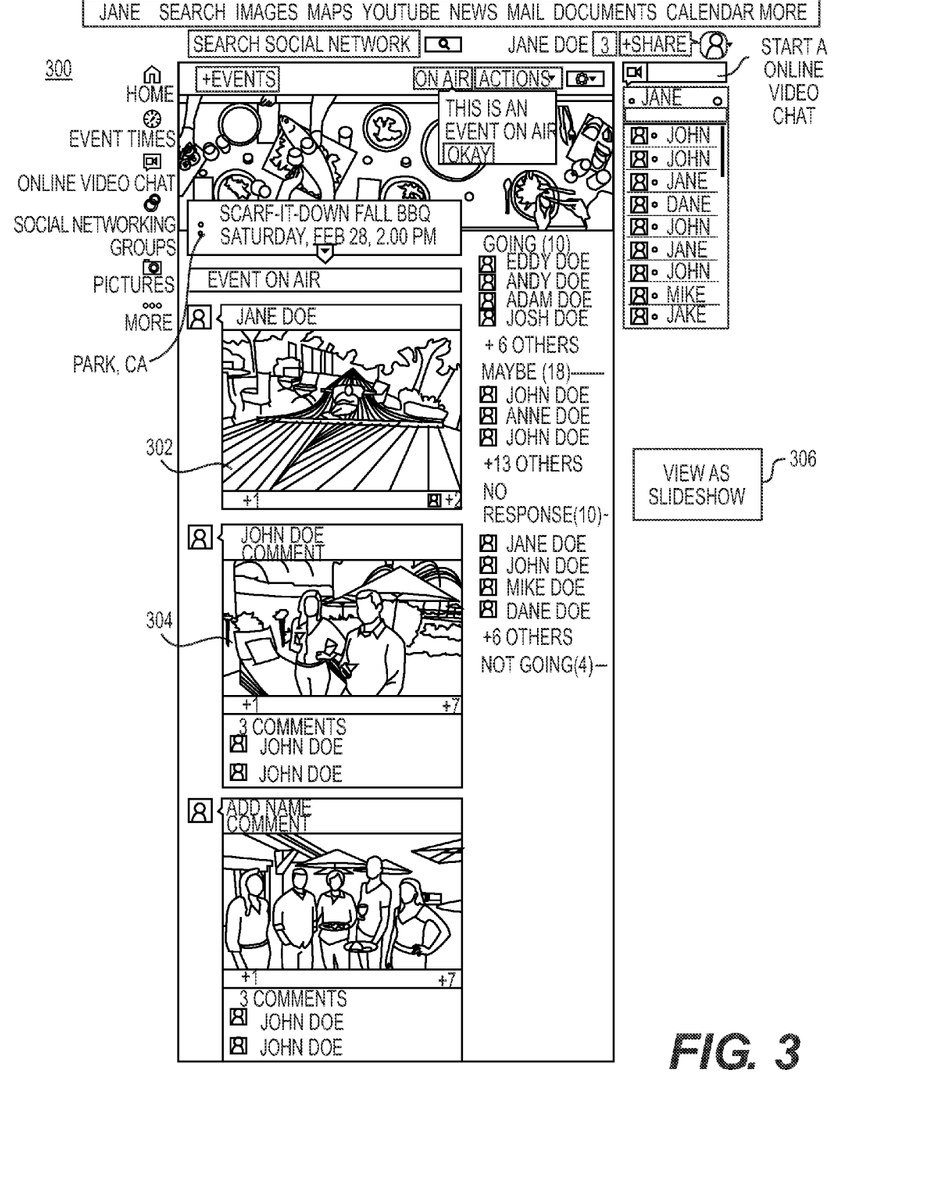
FIG. 3 is a diagrammatic view of an event page associated with the slideshow generation process of FIG. 1.

Referring now to FIG. 3, an example event page screenshot 300 associated with slideshow generation process 10 is provided. Accordingly, slideshow generation process 10 may be configured to generate (102) an event page 300 corresponding to a particular event. In this particular embodiment, event page 300 may be associated with a social network. As shown in FIG. 3, event page 300 may be configured to allow (104) access to event page 300 to one or more members of the social network. For example, in some instances, invitations may be sent to a subset of members of the social network so that only those who have been invited may attend and/or access event page 300.

In some embodiments, event page 300 may be accessed directly from the user's social networking page. For example, a link to event page 300 may be provided on the user's social networking page, via an email link, or using any suitable method. In some embodiments, the user's who have accepted the invitation may be shown on event page 300 (e.g. those user's who are present and currently viewing event page 300).

Slideshow generation process 10 may be configured to receive (106) at least one photograph (e.g. 302, 304, etc.) at event page 300 from the one or more members of the social network. As shown in FIG. 3, the photographs may be uploaded by various attendees of the event. The attendee's personal information may be displayed at the event page as well. For example, the attendee's profile picture, name, identification information, personal comments related to the photo, etc. may also be included. Slideshow generation process 10 may display (108) the photographs (e.g. 302, 304, etc.) at event page 300 as is shown in FIG. 3. In some embodiments, the photograph itself may include a display of various information, some of which may include, but is not limited to, an event name, a contributor name, a contributor image, a creation time, and a relative time of creation.

Embodiments of the slideshow generation process described herein may include a "View as slideshow" button or link 306 associated with event page 300. In this way, a user, for example, one or more of users 46, 48, 50, 52 may access the "view as slideshow" link using one or more of client applications 22, 24, 26, 28. In some embodiments, the client applications may be a social networking application as discussed above.

Accordingly, slideshow generation process 10 may be configured to generate (108) a slideshow based upon, at least in part, the at least one photograph received at event page 300. In this way, upon selecting link 306, slideshow generation process 10 may display one or more photographs such as those shown in FIGS. 4-6. The displaying of photographs and/or the generation of a slideshow may be performed before, during, or after the event has concluded.

Figure 4:
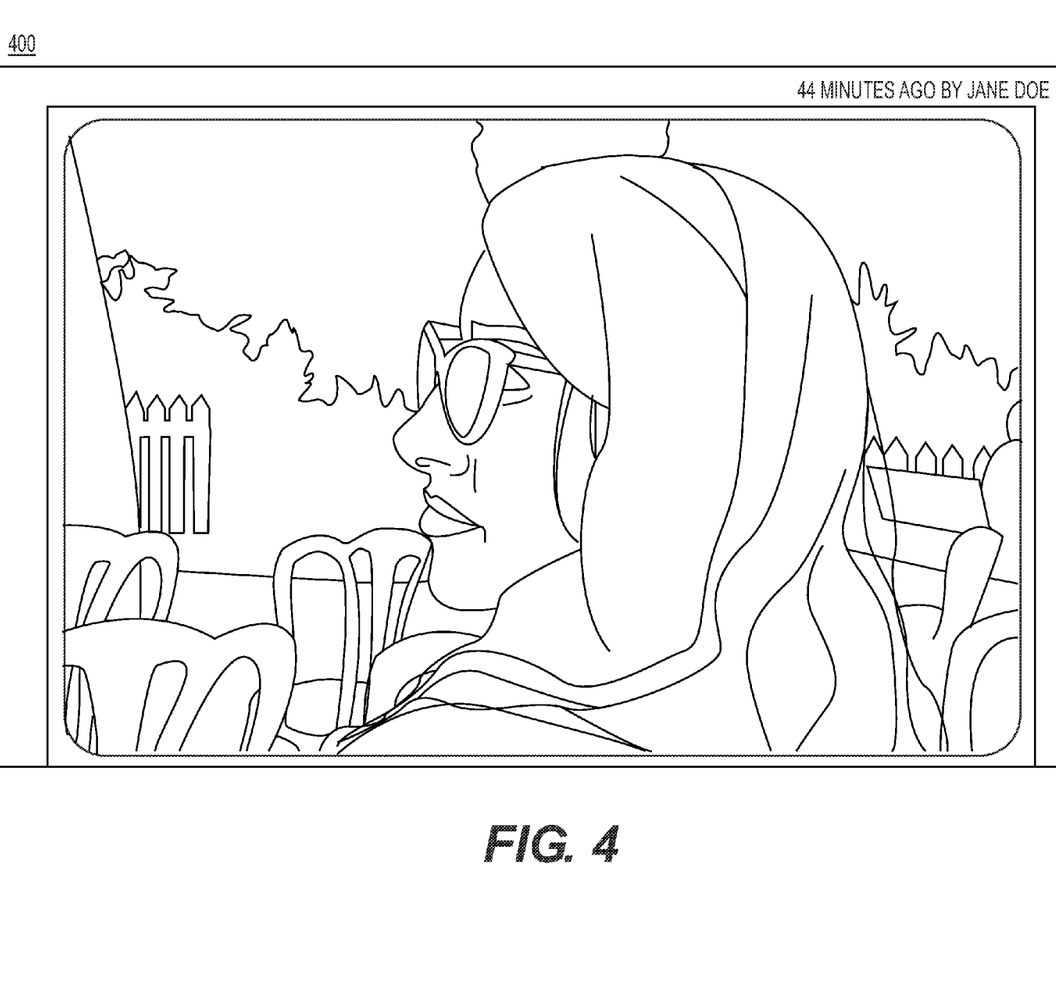
FIG. 4 is a diagrammatic view of a photo uploaded to the slideshow generation process of FIG. 1.
Figure 5:
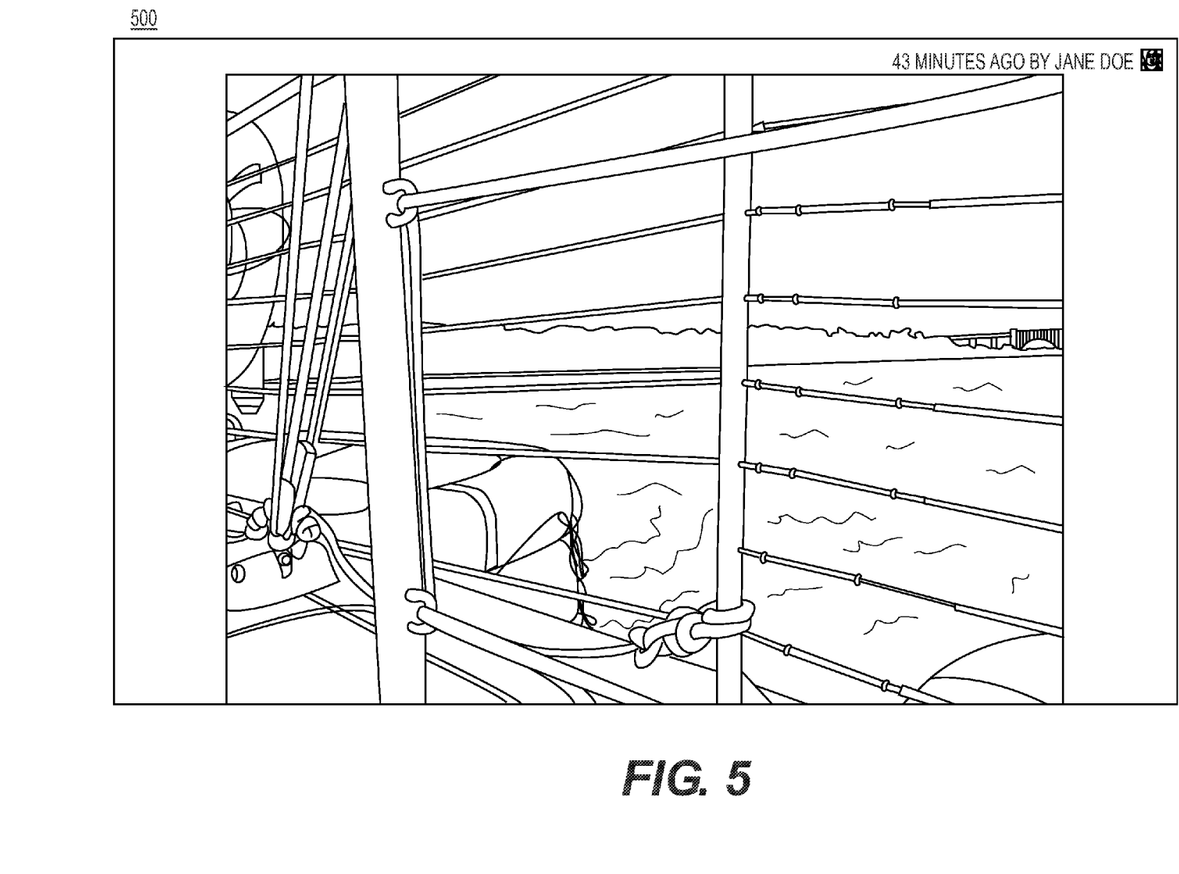
FIG. 5 is a diagrammatic view of a photo uploaded to the slideshow generation process of FIG. 1.
Figure 6:
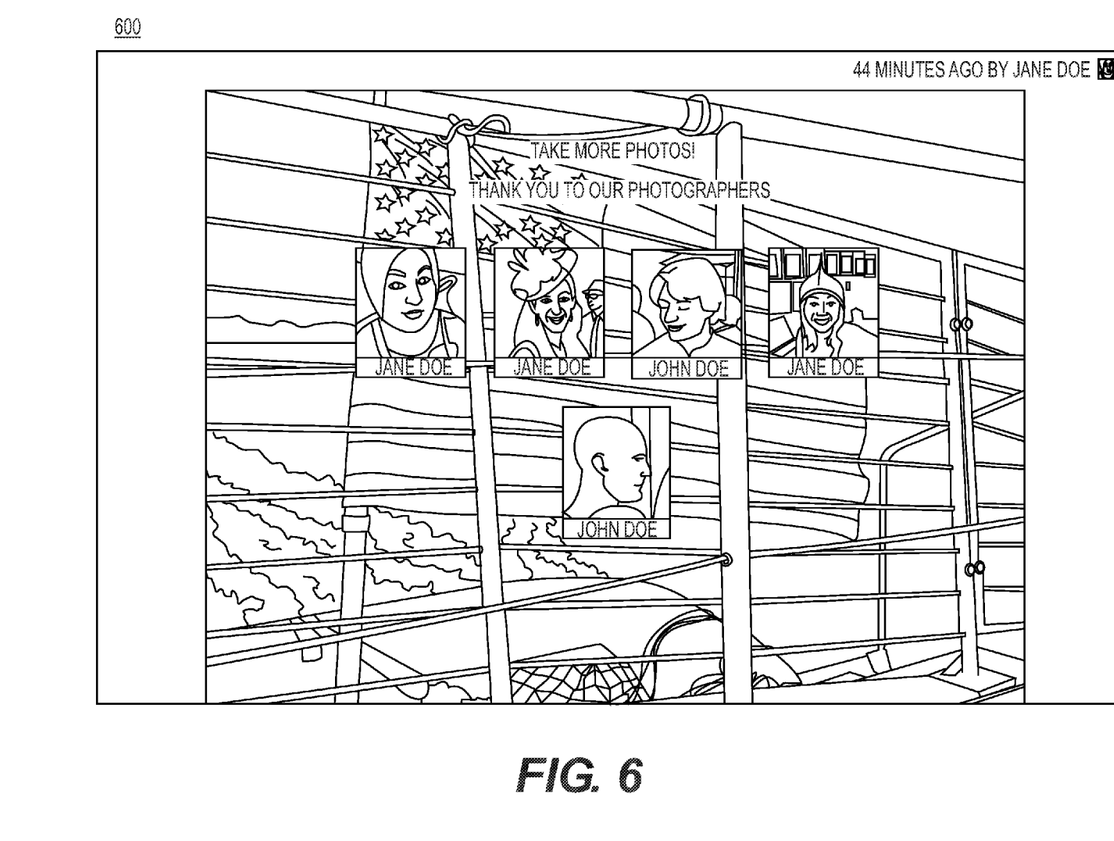
FIG. 6 is a diagrammatic view of a credits page displayed in accordance with the slideshow generation process of FIG. 1.

Embodiments of slideshow generation process 10 may provide a variety of different options, which may be available for the users to select. Some options may include, but are not limited to, the ability to enter into full screen (as shown in FIGS. 4-6) with no browser controls and to depict one or more photos at a time. Additionally and/or alternatively, a branded area may be located at the top of each photo (e.g. to provide advertising, etc.). Slideshow generation process 10 may also provide a truncated event name, contributor face and name, when uploaded (e.g., a creation time stamp and/or a relative time (e.g., just now –<1 minute, n minutes ago, etc.).

Embodiments of slideshow generation process 10 may include providing one or more slideshow controls, which may be configured to allow for personalized slideshow experience. For example, some slideshow controls may include, but are not limited to, a forward and backward button that fade away, a pre-canned speed of time per photo (e.g. 3 seconds, etc.), no user configuration, mouse movement (e.g., shows resume/exit, show forward/backward, etc.), and close slideshow (e.g., esc, exit, etc.).

Embodiments of slideshow generation process 10 may include photograph display logic. In some embodiments, the photograph display logic may be configured to determine a manner of displaying the at least one photograph. For example, slideshow generation process may start with the most recent photograph that has been uploaded. In this particular example, the photograph may be displayed for a fixed number of seconds, for example with a default of 4 seconds. In some embodiments, the slideshow may be either in a congested or quiet state depending on the number of photographs that have been uploaded during a particular time period.

For example, assume the slideshow will take five minutes. The photograph display logic may work in the following manner. If there are too many photos to fit in the five minute interval, then the slideshow may be congested. In this way, slideshow generation process 10 may skip photographs so they fit in the slideshow. If there are too few photos to fill in the five minute interval, then the slideshow is quiet so show all the slides. Once the slideshow is finished, if there are no new photos then show photos that were previously skipped in the congested period. If any new photograph arrives during this period, transition directly to this photograph. If there are no new photographs to play at all, including no skipped photographs, then pause on the last photograph for 15 seconds and then bring up the credits page (see FIG. 6) for 30 seconds if it has not been shown in the last 10 minutes. If there are still no new photographs, then start playing the slideshow from the beginning.

In some embodiments, the slideshow generation process may include photograph skipping logic. For example, in instances where there is a congested period (i.e. too many photographs) the following algorithm may be used:

Where N=no. of photos; t=seconds each photo will be shown

If 300/N<t then:
p=div(N,div(300,t))
show [photo(0), photo(p), photo(2*p), photo(75*p)]
else:
show every photo Embodiments of slideshow generation process 10 may also include a credits page as shown in FIG. 6. Accordingly, credits page 600 may include, for example, a Call to action: "Take More Photos!", a list of users that have contributed photos to event, etc. If the event is currently happening slideshow generation process 10 may show a QR Code that points to a particular URL for the event page. In some embodiments, the URL may contain a multiuse invite token so any user that opens it will automatically be invited to the event and can start contributing photos.

Embodiments of slideshow generation process 10 may allow for a slideshow that occurs after the event has concluded. For example, after the event has concluded the slideshow may behave more like a general slideshow. For example, the post-event slideshow may be launchable from using any suitable approach and may traverse through the current batch of photos (e.g. event highlight, chronological order etc). In some embodiments, the post-event slideshow may include all the properties as the during event slideshow except no quiet period and no congested period logic.

Embodiments of slideshow generation process 10 may be configured to enable social commentary associated with the at least one photograph. For example, the post-event slideshow may support social proof, like comments and +1 counts, may be quick +1 to pause the slideshow as well. The end of the post-event slideshow may include a Thank you and take more photos page, an option to loop back to the beginning, and may automatically loop back after a specified amount of time (e.g. two minutes).

Embodiments of the slideshow generation process may be configured to operate with one or more mobile devices such as those shown in FIG. 1. Additionally and/or alternatively, slideshow generation process may include slideshow controls, some of which may include, but are not limited to, speed selection (e.g., Slow −5 second, Medium (default) −2.5 second, Fast −1 second), jump to beginning, jump to end, etc.

Figure 7:
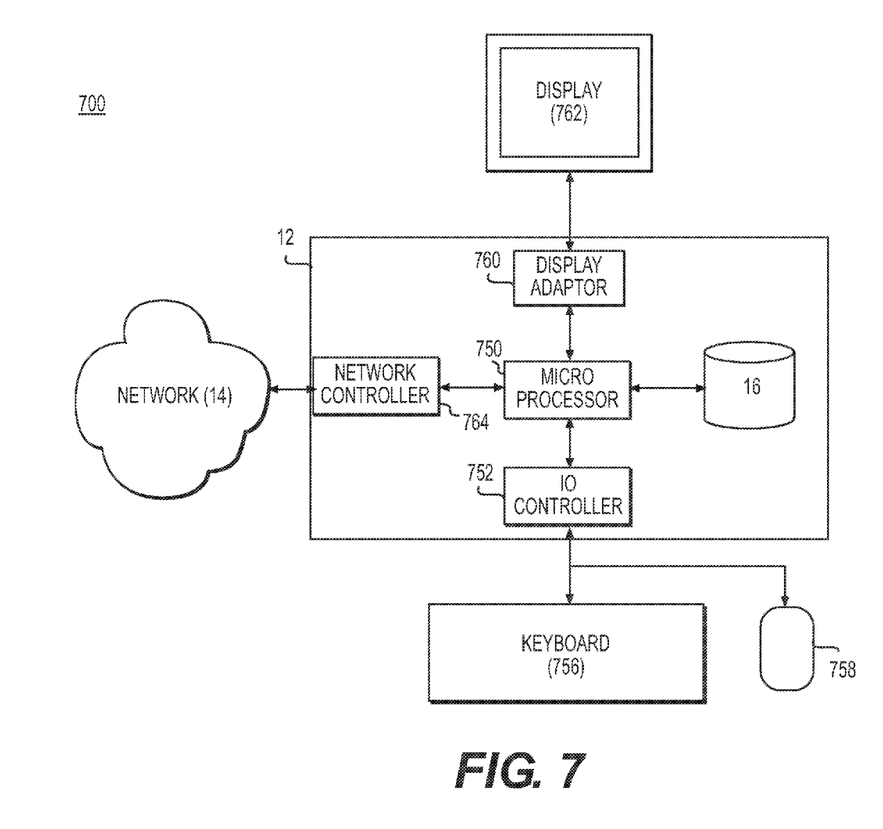
FIG. 7 is a diagrammatic view of a computing system, which may be used in accordance with the slideshow generation process described herein.

Referring also to FIG. 7, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, image comparison process 10 may be substituted for computing device 12 within FIG. 7, examples of which may include but are not limited to client electronic devices 28, 30, 32, 34.

Computing system 12 may include microprocessor 750 configured to e.g., process data and execute instructions/code for image comparison process 10. Microprocessor 750 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 752 may be configured to couple microprocessor 750 with various devices, such as keyboard 756, mouse 758, USB ports (not shown), and printer ports (not shown). Display adaptor 760 may be configured to couple display 762 (e.g., a CRT or LCD monitor) with microprocessor 750, while network adapter 764 (e.g., an Ethernet adapter) may be configured to couple microprocessor 750 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 750) of a general purpose computer/special purpose computer/other programmable data processing apparatus (e.g., computing device 12), such that the instructions, which execute via the processor (e.g., processor 750) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A non-transitory computer readable medium with instructions stored thereon that, when executed by one or more processors, cause the one or more processors to perform operations comprising:

generating, using one or more computing devices, an event page corresponding to a particular event, the event page associated with a social network, wherein the particular event takes place at a physical location at which two or more photographs are taken;

allowing access to the event page to two or more members of the social network;

receiving, during the event, the two or more photographs at the event page from at least one of the two or more members of the social network;

providing the two or more members with an option to view the two or more photographs as a slideshow;

generating the slideshow based upon, at least in part, the two or more photographs received at the event page, wherein the generating includes:

determining a number of the received photographs;

based on a predetermined time interval for the slideshow, a predetermined time of display per photograph, and the number of the received photographs, determining whether there are too many photographs to fit in the slideshow by comparing the predetermined time of display per photograph with the predetermined time interval divided by the number of the received photographs, wherein if the predetermined time of display per photograph is greater than the predetermined time interval divided by the number of the received photographs, it is determined that there are too many photographs, and if the predetermined time of display per photograph is not greater than the predetermined time interval divided by the number of the received photographs, it is determined that there are not too many photographs;

if it is determined that there are too many photographs to fit in the slideshow, generating the slideshow wherein at least one of the received photographs is excluded from the slideshow; and if it is determined that there are not too many photographs to fit in the slideshow, generating the slideshow wherein each of the received photographs is included in the slideshow; and displaying at least a portion of the slideshow on the event page.

2. A computer-implemented method comprising:

generating, using one or more computing devices, an event page corresponding to a particular event, the event page associated with a social network, wherein the particular event takes place at a physical location and wherein two or more photographs are taken at the event at the physical location;

allowing access to the event page to two or more members of the social network;

receiving, during the event, the two or more photographs at the event page from at least one of the two or more members of the social network;

generating a slideshow based upon, at least in part, the two or more photographs received at the event page, wherein the generating includes:
  determining a time interval for the slideshow;
  determining a number of the received photographs;
  determining whether a time of display per photograph is greater than the time interval divided by the number of the received photographs;
  if it is determined that the time of display per photograph is greater than the time interval divided by the number of the received photographs, generating the slideshow wherein at least one of the received photographs is excluded from the slideshow; and
  if it is determined that the time of display per photograph is not greater than the time interval divided by the number of the received photographs, generating the slideshow wherein each of the received photographs is included in the slideshow; and
causing the slideshow to be displayed on the event page.

3. The computer-implemented method of claim 2 wherein the slideshow is caused to be displayed during or after the event.

4. The computer-implemented method of claim 2 further comprising:
  providing a slideshow generation option on the event page.

5. The computer-implemented method of claim 2 wherein two or more photographs include a display of one or more of an event name, a contributor name, a contributor image, a creation time, and a relative time of creation.

6. The computer-implemented method of claim 2, further comprising:
  enabling social commentary associated with the two or more photographs.

7. The computer-implemented method of claim 2, further comprising:
  allowing access to the event page to a restricted subset of the two or more members of the social network.

8. A computing system including a processor and memory configured to perform operations comprising:
  generating, using one or more computing devices, an event page corresponding to a particular event, the event page associated with a social network, wherein the particular event takes place at a physical location and wherein two or more photographs are taken at the physical location during the event;
  allowing access to the event page to two or more members of the social network;
  receiving, during the event, the two or more photographs at the event page from at least one of the two or more members of the social network;
  generating a slideshow based upon, at least in part, the received photographs, wherein the generating includes:
    determining a time interval for the slideshow;
    determining a number of the received photographs;
    determining whether a time of display per photograph is greater than the time interval divided by the number of the received photographs;
    if it is determined that the time of display per photograph is greater than the time interval divided by the number of the received photographs, generating the slideshow wherein at least one of the received photographs is excluded from the slideshow; and
    if it is determined that the time of display per photograph is not greater than the time interval divided by the number of the received photographs, generating the slideshow wherein each of the received photographs is included in the slideshow; and
  causing the slideshow to be displayed on the event page.

9. The computing system of claim 8 wherein the slideshow is caused to be displayed during or after the event.

10. The computing system of claim 8 further configured to perform operations comprising:
  providing a slideshow generation option on the event page.

11. The computing system of claim 8 wherein the two or more photographs include a display of one or more of an event name, a contributor name, a contributor image, a creation time, and a relative time of creation.

12. The computing system of claim 8, further configured to perform operations comprising:
  enabling social commentary associated with the two or more photographs.

13. The computer-implemented method of claim 2, further comprising:
  while the slideshow is displayed on the event page, receiving at least one additional photograph; and
  upon completion of the slideshow, transitioning directly to the at least one additional photograph.

14. The computer-implemented method of claim 2, further comprising:
  upon completion of the slideshow, determining that no additional photographs were received during display of the slideshow;
  determining whether one or more of the received photographs were excluded;
  based on determination that one or more of the received photographs were excluded, displaying the one or more of the received photographs that were excluded; and
  based on determination that none of the received photographs were excluded, pausing the slideshow at a last photograph.

15. The computing system of claim 8 further configured to perform operations comprising:
  selecting a subset of the received photographs in the slideshow, the subset including every pth photograph of the received photographs, wherein p=div(N, div(T, t)) where N is the number of the received photographs, T is the time interval for the slideshow, and t is the time of display per photograph.

16. The computing system of claim 8 further configured to perform operations comprising:
  determining whether a new photograph was received at the event page during display of the slideshow;
  based on determination that the new photograph was received, transitioning directly to the new photograph upon completion of the slideshow;
  based on determination that the new photograph was not received, determining whether one or more of the received photographs were excluded;
  upon determining that one or more of the received photographs were excluded, displaying the excluded one or more photographs; and
  upon determining that none of the received photographs were excluded, pausing the slideshow at a last photograph.

17. The non-transitory computer readable medium of claim 1, wherein the instructions cause the one or more processors to perform further operations comprising:
  while the slideshow is displayed on the event page, receiving at least one new photograph; and upon completion of the slideshow, transitioning directly to the at least one new photograph.

* * * * *